United States Patent [19]

Tanaka et al.

[11] Patent Number: 5,587,405
[45] Date of Patent: Dec. 24, 1996

[54] INK COMPOSITIONS

[75] Inventors: Ban Tanaka, Toyota; Hiroki Nii; Kosaku Yamada, both of Fukuyama; Hideo Kushida, Yachiyo; Takashi Miya, Kamagaya; Shuichi Koshio, Sakura; Tadashi Hayakawa, Chiba, all of Japan

[73] Assignees: Yoshino Kogyosho Co., Ltd., Tokyo; Hayakawa Rubber Co., Ltd., Hiroshima, both of Japan

[21] Appl. No.: 471,449

[22] Filed: Jun. 6, 1995

Related U.S. Application Data

[63] Continuation-in-part of Ser. No. 111,571, Aug. 25, 1993, abandoned.

[30] Foreign Application Priority Data

Sep. 14, 1992 [JP] Japan ..................... 4-269146

[51] Int. Cl.$^6$ .................... C08F 2/48; C08F 2/46
[52] U.S. Cl. ................ 522/98; 523/161; 522/92; 522/93; 522/96; 260/DIG. 38; 106/20 B; 525/12; 525/20; 525/23; 525/28; 525/29; 525/31; 525/35; 525/36; 525/39; 525/48; 525/445
[58] Field of Search .................. 523/160, 161; 522/92, 93, 96, 98; 260/DIG. 38; 106/20 B; 525/12, 20, 23, 28, 29, 31, 35, 36, 39, 48, 445

[56] References Cited

U.S. PATENT DOCUMENTS

| | | | |
|---|---|---|---|
| 4,333,998 | 6/1982 | Leszyk | 430/12 |
| 4,525,258 | 6/1985 | Watanabe et al. | 204/159.23 |
| 4,561,950 | 12/1985 | Leo | 522/91 |
| 4,786,658 | 11/1988 | Hashimoto et al. | 522/121 |
| 4,884,866 | 12/1989 | Hashimoto et al. | 350/96.34 |
| 4,929,469 | 5/1990 | Kimura et al. | 427/511 |
| 4,985,473 | 1/1991 | Williams et al. | 522/89 |
| 5,091,440 | 2/1992 | Griswold | 522/99 |
| 5,200,438 | 4/1993 | Fuji et al. | 522/96 |
| 5,279,917 | 1/1994 | Adachi et al. | 430/157 |

OTHER PUBLICATIONS

CA109(14): 111566c, 1988.
CA108(22): 195943p, 1987.
CA108(20): 177228e, 1987.
CA108(16): 137363p, 1987.
CA107(10): 87201r, 1986.
CA104(20): 177777a, 1985.
CA103(20): 169914g, 1985.
CA96(18): 152845z, 1981.
CA96(18): 152830r, 1981.
CA96(18): 152829x, 1981.
CA96(10): 77540r, 1981.
CA85(18): 134416d, 1976.
CA84(10): 67883t, 1975.
CA72(4): 17290d, 1968.
CA113(26): 241528k, 1990.
CA113(22): 201408q, 1990.
CA113(14): 117171z, 1990.
CA113(8): 68388q, 1989.
CA112(26): 243102v, 1989.
CA112(18): 169123j, 1989.
CA112(8): 66747m, 1989.
CA112(2): 14302t, 1989.
CA111(20): 184234u, 1989.
CA111(16): 144164q, 1989.
CA111(16): 144162n, 1989.
CA111(16): 144149p, 1988.
CA111(14): 123821m, 1988.
CA111(12): 105797d, 1988.
CA110(26): 240213e, 1988.
CA110(22): 202945n, 1988.
CA110(20): 182974r, 1988.
CA110(18): 163545k, 1988.
CA109(14): 119716x, 1988.
CA114(14): 119715w, 1988.
CA117(2): 174346z, 1991.
CA116(16): 162555a, 1991.
CA116(16): 162548a, 1991.
CA116(14): 140142m, 1991.
CA116(12): 117260q, 1991.

(List continued on next page.)

*Primary Examiner*—Paul R. Michl
*Assistant Examiner*—John J. Guarriello
*Attorney, Agent, or Firm*—Oliff & Berridge

[57] ABSTRACT

A radiation-curable ink composition contains a vehicle mixture comprising: (A) at least one linear polyester oligomer and/or polymer substantially free of an acid group and free of a polymerizable double bond in a molecule, wherein 1 to 10 double bonds are pendent from the linear polyester chain, and/or mixture thereof, (B) at least one single double bond-containing carboxylic acid wherein the acid has at least one acid group, and/or carboxylic ester of the said acid, and/or carboxylic amide of the said acid, and/or mixture thereof, (C) a double bond-containing polycarboxylic ester, wherein 2 to 10 acid groups are present and at least 2 double bonds are pendent from the ester having 2 to 10 acid groups, (D) at least one double bond-containing fluorinated carboxylic ester, and/or block copolymer comprising a fluorinated alkyl group-containing polymer segment and a (meth)acrylic polymer segment, and/or block copolymer comprising a siloxane group-containing polymer segment and a (meth)acrylic polymer segment, and/or mixture thereof, (E) a double bond-containing carboxylic ester, having at least 2 double bonds and free of an acid group, provided that it is excluded from the above-mentioned ingredient (A), and (F) at least one single double bond-containing carboxylic ester and/or amide and/or imide free of an acid group, and/or mixture thereof, wherein the acid value of the vehicle mixture is from 5 to 100, is provided. The ink is useful in displaying and decorating trade names, designs, explanatory notes, bar code, etc. on specific thermoplastic products and the cured ink film is easily detachable with an aqueous alkali solution.

27 Claims, No Drawings

OTHER PUBLICATIONS

CA116(6): 48922t, 1991.
CA116(4): 31459z, 1991.
CA116(2): 13408c, 1991.
CA115(22): 244055f, 1991.
CA115(18): 194242s, 1991.
CA115(18): 194241r, 1991.
CA115(18): 194240q, 1991.
CA115(16): 170716y, 1991.
CA115(14): 146644c, 1991.
CA115(10): 102849u, 1990.
CA115(6): 60893w, 1990.
CA114(26): 256975y, 1990.
CA114(18): 174945z, 1990.
CA114(14): 133071t, 1990.
CA114(12): 111930v, 1990.
CA119(16): 170515q, 1993.
CA119(10): 105905c, 1993.
CA119(10): 105904b, 1993.
CA119(8): 82920n, 1992.
CA119(6): 59812v, 1993.
CA119(2): 9792t, 1993.
CA118(22): 222916x, 1992.
CA118(20): 202076v, 1992.
CA118(16): 157943n, 1992.
CA118(14): 136238w, 1992.
CA118(12): 113215x, 1992.
CA119(12): 113214w, 1992.
CA118(12): 113134v, 1992.
CA117(26): 261701x, 1992.
CA117(22): 224625e, 1992.
CA117(16): 160916r, 1992.
CA117(12): 121589s, 1992.
CA117(12): 121564e, 1991.
CA117(6): 58950k, 1991.
CA117(6): 58925f, 1991.

INK COMPOSITIONS

This is continuation-in-part of application Ser. No. 08/111,571, filed Aug. 25, 1993 now abandoned.

FIELD OF THE INVENTION

The present invention relates to a novel radiation-curable type printing ink useful for directly printing trade names, designs, explanatory notes, bar code, etc. on a plastic product, if desired, a roughened surface of the plastic product, for displaying and decorating, quickly curing the printed ink on a high-speed drying line to form a dried film capable of maintaining the quality required at the distribution stage, and after collection of the used product, dissolving or removing the film with an aqueous alkaline solution so that the base materials are recovered in a clean condition.

More specifically, the present invention relates to the radiation-curable type printing ink useful in displaying and decorating trade names, designs, explanatory notes, bar code, etc. on specific thermoplastic products such as polyethylene terephthalate resin products.

BACKGROUND OF THE INVENTION

The thermoplastic resin product, particularly polyethylene terephthalate product, has been utilized especially for containers for various applications since it is free from toxicity, superior in gas-barrier ability and water-impermeability to other synthetic resins and having an exterior appearance similar to that of glass, and the like. Such applications include containers for cosmetics and toiletries, liquid seasonings, drinks such as beer or cola, medicine, detergents, and the like. In many cases, explanatory notes and trade names have been printed on the side wall of the container body with the printing ink made from ultraviolet-curable type resin as a vehicle.

In recent years, the environment has been a matter of worldwide concern, and industrial waste, in particular, the discharge of industrial products in a large scale, has attracted public attention, which requires an urgent countermeasure for its reduction. Covering a certain industrial product such as a metal product and glass product etc., collection of used product has commenced and while it is somewhat imperfect yet, the volume of discharge has now been decreased.

However, the recovery system has not been applied to any plastic products partly because most of them are combustible. This is attributable to the fact that the various types of plastic products are discarded as lump-sum "plastic" since it is difficult to classify many plastic products by their types. In cases where the plastic is classified by its type and collected in groups of each type separately, it my be utilized as a secondary product upon processing for regeneration so that loss of thermal energy in incineration as well as pollution of the atmosphere with $CO_2$ gas can be prevented. Thereby, a greater contribution may be expected in cleaning the environment on the earth.

Plastics, especially the reproducible thermoplastic resins, are the industrial products that have a merit in the recovery. But many plastic products contain various additives depending upon application purposes and end-usage, and the composition is not always uniform even if classified in the same resin category.

Among them, plastic containers have a relatively stable composition even though they contain some quantity of additives to prevent deterioration in the quality of the contents, which makes the approach to the regeneration easier. The container made of polyethylene terephthalate, in particular, is utilized as a transparent container for drinks on a big scale and the early realization of the system for its collection and regeneration stands a better chance as one of the promising products to be collected in a route reverse to that of sales channel similar to glass bottles.

One obstacle in the collection and regeneration is the decoration, i.e. labeling or printing of marks, figures, explanatory notes and the like on the container to display trading image. An immediate task is how to conduct a lump-sum removal of the decorative portions without any sorting work after their collection to restore an original shape to the container materials.

SUMMARY OF THE INVENTION

The present invention has now solved this problem by introducing a radiation-curable type ink removable in a short time with an aqueous alkaline solution as applied in the case of removing a paper label as one of the measures to deal with the outstanding task.

The present invention relates to a radiation-curable ink composition which comprises a vehicle mixture comprising:

(A) at least one ingredient selected from the group consisting of a linear polyester oligomer substantially free of an acid group and free of a polymerizable double bond on the linear polyester chain, wherein 1 to 10 double bonds are pendent from the linear polyester chain; a linear polyester polymer substantially free of an acid group and free of a polymerizable double bond on the linear polyester chain, wherein 1 to 10 double bonds are pendent from the linear polyester chain; and mixtures thereof, (B) at least one ingredient selected from the group consisting of a one double bond-containing carboxylic acid wherein the acid has at least one acid group, a carboxylic ester of the said acid, a carboxylic amide of the said acid, and mixtures thereof, (C) a double bond-containing polycarboxylic ester wherein 2 to 10 acid groups are present and at least 2 double bonds are pendent from the carboxylic ester having 2 to 10 acid groups, (D) at least one ingredient selected from the group consisting of a double bond-containing fluorinated carboxylic ester, a block copolymer comprising a fluorinated alkyl group-containing polymer segment and a (meth)acrylic polymer segment, a block copolymer comprising a siloxane group-containing polymer segment and a (meth)acrylic polymer segment, and mixtures thereof, (E) a double bond-containing carboxylic ester, having at least 2 double bonds and free of an acid group, provided that it is excluded from the above-mentioned ingredient (A) and (F) at least one ingredient selected from the group consisting of a one double bond-containing carboxylic ester free of an acid group; a one double bond-containing carboxylic amide free of an acid group; a one double bond-containing carboxylic imide free of an acid group; and mixtures thereof, wherein the acid value of the vehicle mixture is from 5 to 100.

The radiation-curable type ink composition according to the invention is used not only for the purpose of protecting base surfaces and functional parts temporarily but also mainly for marking so that printed items which are necessary during distribution processes and for the consumer, such as trade names, designs for enhancing trading image, remarks on the contents, explanatory notes on handling, manufacturer's names, bar codes and the like can be kept in a stable condition and, upon their collection, the prints can be removed extremely easily by a certain method to enable the collection and regeneration of plastic materials.

DETAILED DESCRIPTION OF THE INVENTION

The radiation-curable type ink composition according to the invention is characterized in that the mixture of the above-mentioned (A) to (F) is the major vehicle ingredient wherein the acid value of the vehicle mixture is from 5 to 100.

The radiation-curable type ink composition is also characterized, in an aspect of the present invention, in that the vehicle mixture comprises the above-identified components (A) to (D), and optionally components (E) and (F). The vehicle mixture has an acid value of from 5 to 100.

In an aspect of the present invention, the alkali-detachable radiation-curable type ink according to the present invention is preferably produced by adding 0 to 20 parts by weight of a photopolymerization initiator, 0 to 20 parts by weight of a photosensitizer, 0 to 100 parts by weight of an organic and/or inorganic pigment, if necessary a small amount of additives including a surfacer (leveling agent), a defoamer (anti-foaming agent), a slipping agent, a thermal polymerization inhibitor, and the like to 100 parts by weight of the above-mentioned vehicle, and by kneading it well using a dispersing machine such as a roll mill, a dissolver, a ball mill and the like.

The radiation-curable type ink composition according to the invention is also characterized in that the mixture of the above-mentioned (A) to (F) is the major vehicle ingredient wherein the acid value of the vehicle mixture is from 5 to 100 and the ink composition comprises additionally 0 to 20 parts by weight of a photopolymerization initiator, 0 to 20 parts by weight of a photosensitizer, 0 to 100 parts by weight of an organic and/or inorganic pigment, and, if necessary, a small amount of additives including a surfacer, a defoamer, a slipping agent, a thermal polymerization inhibitor, and the like to 100 parts by weight of the above-mentioned vehicle.

In a representative embodiment of the present invention, the radiation-curable type ink composition comprises (1) the above-mentioned (A) to (C) and (E) to (F) components and, as the (D) component, a double bond-containing fluorinated carboxylic ester wherein the fluorine component is oriented on the surface of copolymer or polymer to give water-repellency, or (2) the above-mentioned (A) to (C) and (E) to (F) components and, as the (D) component, a block copolymer which comprises a surface-oriented and water-repellent fluorinated alkyl group-containing polymer segment and an acrylic polymer segment, or (3) the above-mentioned (A) to (C) and (E) to (F) components and, as the (D) component, a block copolymer which comprises a surface-oriented and water-repellent siloxane group-containing polymer segment and a (meth)acrylic polymer segment, wherein the acid value of the vehicle mixture is from 5 to 1 00 and the ink composition comprises additionally 0 to 20 parts by weight of a photo-polymerization initiator, 0 to 20 parts by weight of a photosensitizer, and 0 to 100 parts by weight of an organic and/or inorganic pigment to 100 parts by weight of the above-mentioned vehicle.

The present invention also relates to the novel radiation-curable type printing ink composition which comprises the mixture of the above-mentioned (A) to (C) and (E) to (F) components and, as the (D) component, two or three members selected from the group consisting of a double bond-containing fluorinated carboxylic ester acid wherein the fluorine component is oriented on the surface of a copolymer or polymer to give water-repellency, a block copolymer which comprises a surface-oriented and water-repellent fluorinated alkyl group-containing polymer segment and a (meth)acrylic polymer segment, and a block copolymer which comprises a surface-oriented and water-repellent siloxane group-containing polymer segment and a (meth)acrylic polymer segment, wherein the acid value of the vehicle mixture is from 5 to 100 and the ink composition comprises additionally 0 to 20 parts by weight of a photopolymerization initiator, 0 to 20 parts by weight of a photosensitizer, and 0 to 100 parts by weight of an organic and/or inorganic pigment to 100 parts by weight of the above-mentioned vehicle.

In a preferable embodiment of the present invention, 0 to 60 parts by weight of an organic and/or inorganic pigment to 100 parts by weight of the above-mentioned vehicle may be used.

In the case of the printing method according to the present invention, printing may be possible without any surface treatment of the thermoplastic resin product prior to the printing process but the surface of the thermoplastic resin product my be treated with flame, corona discharge or anchor coating. The composition of the radiation-curable ink according to the present invention is adhered to the plastic product in extremely close contact due to the adhesiveness as well as the stress-peeling preventive mechanism attributable to the low contractivity based on the fundamental structure of oligomer having pendent double bonds and/or polymer thereof. The close adhesion of the cured composition according to the present invention to the plastic base even without any pretreatment provides a remarkable advantage in curtailing production steps in an overall printing process.

Further, the alkali-removable radiation-curable type ink composition according to the present invention contains the double bond-containing fluorinated carboxylic ester and/or fluorinated block copolymer and/or siloxane-containing block copolymer, and, upon printing, the fluorine and/or silicon rich parts are oriented on the surface, whereby the cured ink of the present invention affords chemical resistance, water-repellency, soil resistance and abrasion resistance and enhancing the stability during distribution of printed products as well as during its actual use.

Moreover, the alkali-removable radiation-cured ink includes a salt of alkali metal and an acid group of double bond-containing (poly)carboxylic ester which facilitates formation of a water soluble salt or a salt capable of water-swelling after curing, and the cured ink film is removed in a filmy form without difficulty from the used printed product by means of treatment with an aqueous alkaline solution. Thereby, regenerative plastic resins from the products can be recovered without contamination.

The filmy detachment of cured ink film is caused by the penetration of an aqueous alkaline solution through the interface between plastic bases and ink film while preventing permeation of an aqueous alkaline solution from the surface due to the water-repellency created by the surface orientation of double bond-containing fluorinated carboxylic ester and/or a fluorinated block copolymer and/or a siloxane-containing block copolymer. As such, the ink film so removed can be collected in a simple process such as filtration. There is no problem with water polution since none of them are discharged into waste water.

Furthermore, the scope of its application is further enlarged in view of these possibilities. As the amount of double bond-containing fluorinated carboxylic ester and/or fluorinated block copolymer and/or siloxane-containing block copolymer is reduced, the ink film increases hydrophilic property. If the amount of the ingredient (B) among the said ingredients (B) and (C) increases, the cured ink film as a whole dissolves in an aqueous alkaline solution and it can be removed from the surface of the plastic.

The ingredient (A) for the present vehicle mixture in the radiation-curable ink composition according to the present invention is at least one ingredient selected from the group consisting of a linear polyester oligomer substantially free of an acid group and a polymerizable double bond on the linear polyester chain, wherein 1 to 10 double bonds are pendent from the linear polyester chain; a linear polyester polymer substantially free from an acid group and a polymerizable double bond on the linear polyester chain, wherein 1 to 10 double bonds are pendent from the linear polyester chain; and mixtures thereof.

The linear polyester oligomer and/or polymer having 1 to 10 pendent double bonds in a molecule and having no polymerizable double bond in the main chain represent(s) an oligomer and/or polymer having radiation-polymerizable 1 to 10 double bonds in a molecule. The said oligomer and/or polymer are (is) not only indicating the characteristics of being polymerized with radiation by itself but also capable of polymerizing in combination with other radiation-polymerizable double bond containing compounds.

The pendent double bonds in the said oligomer and/or polymer include those in a vinyl group, allyl group, (meth)-acryloyl group, crotonyl group etc. but (meth)acryloyl is preferable because of its better polymerizability when radiation is applied.

For the polyester oligomer and/or polymer having a (meth)acryloyl group, polyurethane-(meth)acrylate is used in particular as it has an adhesive nature in contact with the base or a flexible chemical structure capable of following the expansion/contraction of the base. It is more preferable to use polyurethane (meth)acrylate made from high molecular polyol wherein the polyester polyol is extended with diisocyanates.

The copolymerized polyester polyols are synthesized mainly with dicarboxylic acid components and glycol components. The polyester has no polymerizable double bond in its skeleton and is called a "saturated polyester".

The dicarboxylic acid component may include as a main constituent an aromatic dicarboxylic acid such as terephthalic acid, isophthalic acid and orthophthalic acid and the like and is used more than 60 mol% in total diacid compounds, and, for the purpose of affording flexibility, an aliphatic dicarboxylic acid such as succinic acid, adipic acid, sebacic acid, dodecane dicarboxylic acid etc. and an alicyclic dicarboxylic acid such as hexahydrophthalic acid and tetrahydrophthalic acid is also used less than 40 mol% in total diacid compounds.

The glycol component may include ethylene glycol, propylene glycol, 1,3-propanediol, 1,4-butanediol, 1,6-hexanediol, neopentyl glycol, diethylene glycol, dipropylene glycol, 1,4-cyclohexanedimethanol, spiro glycol, 1,4-phenylene glycol, an ethylene oxide or polyethylene oxide derivative of bisphenol A, polyethylene glycol, polypropylene glycol, and the like. Depending on necessity, a small amount of triols or tetraols such as trimethylol propane, glycerine, pentaerythritol and the like my be admixed.

In order to synthesize copolymerized polyester polyols from such dicarboxylic acid components and glycol components, an excess amount of the glycol component is used per dicarboxylic acid starting component. It is preferable to perform synthesis so that the terminal carboxylic group may be maintained at less than 50 eq/$10^6$ g in the resultant copolymerized polyester. In cases where it exceeds 50 eq/$10^6$ g, the target polyurethane (meth)acrylate product will not be obtained due to excessive increase of the inactive ends during reaction with diisocyanate compounds at the time of extending polyester polyols to urethane polymers.

In order to obtain the urethane acrylate from the copolymerized polyester polyol so synthesized, the said copolymerized polyester, a polyisocyanate compound and a compound having a (meth)acryloyl group as well as an active hydrogen group may be reacted.

The polyisocyanate compound may include 2,4-trilene diisocyanate, diphenylmethane diisocyanate, 1,3-diisocyanate methylcyclohexane, 1,4-diisocyanate methylcyclohexane, 4,4'-diisocyanate dicyclohexane, 4,4'-diisocyanate dicyclohexylmethane, isophorone diisocyanate and a variety of other commercially available diisocyanates. In addition, when polyfunctional acrylates are required, polyisocyanate in a class more than tri-isocyanate may be applied alone or in combination with the said diisocyanate.

The chemical compound having a (meth)acryloyl group and an active hydrogen group refers to a compound having at least one double bond and at least one hydroxyl group in one molecule. The double bond which can be used in the present invention may be vinylic, allylic, (meth)acrylic, crotonic, etc. The (meth)acryloyl groups are preferred in view of their high sensitivity against radiation.

The chemical compounds having a (meth)acryloyl group and an active hydrogen group may include dihydric alcohol mono(meth)acrylates such as ethylene glycol mono(meth)acrylate, propylene glycol mono(meth)acrylate, butanediol mono(meth)acrylate, diethylene glycol mono(meth)acrylate, dipropylene glycol mono(meth)acrylate and the like; trihydric alcohol mono- or di-(meth)acrylates such as trimethylol ethane mono(meth)acrylate, trimethylol ethane di (meth)acrylate, trimethylol propane mono(meth)acrylate, trimethylol propane di (meth)acrylate, glycerine mono (meth)acrylate, glycerine di(meth)acrylate and the like; polyhydric alcohol (meth)acrylates having a hydroxy group, including the (meth)acrylate of an alcohol containing 4 or more hydroxy groups, such as pentaerythritol mono(meth)acrylate, pentaerythritol di(meth)acrylate, pentaerythritol tri(meth)acrylate and dipentaerythritol tetra(meth)acrylate; a chemical compound having a hydroxy group, derived from (meth)acrylation of caprolactone derivatives of any of the aforementioned alcohols; epoxy(meth)acrylates prepared by a ring-opening addition of (meth)acrylic acids with epoxy compounds, including monoglycidyl ethers; dihydric alcohol diglycidyl ethers such as ethylene glycol diglycidyl ether, polyethylene glycol diglycidyl ether, propylene glycol diglycidyl ether and neopentyl glycol diglycidyl ether; polyhydric alcohol glycidyl ethers such as trimethylol propane triglycidyl ether and the like; the glycidyl ether of a chemical compound having a phenolic hydroxy group, such as bisphenol A glycidyl ether and the like.

These compounds my be used singularly or in combination of 2 or more kinds. The double bond-pendent polyester oligomer and/or polymer which is obtained by reaction of the aforementioned starting compounds may be acceptable if it contains at least one double bond, and those having one to 10 double bonds are utilized for such application. For the purpose of avoiding any tack on cured film surface and maintaining adhesiveness and flexibility in contact with the base, it is preferable to keep at least 3 to 7 double bonds in a single molecule.

The ingredient (B) for the present vehicle mixture in the radiation-curable ink composition according to the present invention is at least one ingredient selected from the group consisting of a one double bond-containing carboxylic acid wherein the carboxylic acid has at least one acid group, a carboxylic ester of the said acid, a carboxylic amide of the said acid, and mixtures thereof.

The group consisting of a one double bond-containing carboxylic acid wherein the carboxylic acid has at least one acid group, a carboxylic ester of the said carboxylic acid and a carboxylic amide of the said carboxylic acid, is regarded, in general, as an "acid monomer". A homopolymer of the acid monomer and a copolymer with higher contents of the acid monomer form water soluble alkali metal salts.

The double bond in the "acid monomer" may be vinylic, allylic, (meth)acrylic, crotonic, etc. The (meth)acryloyl groups are preferable in this instance in view of their high radiation-curing ability. The acid group includes a carboxyl group, sulfonyl group, phosphoryl group and the like but an introduction of carboxyl groups into the molecule may usually serve the purpose. Each molecule requires at least 1 to 2 carboxyl groups.

While the simplest carboxyl group-containing acid monomer is (meth)acrylic acid, it is not desirable to be used as the starting materials for ink products owing to its strong odor and from the safety point of view. Therefore, the acid monomer is synthesized by reacting the compound having a double bond and a hydroxyl group in the same molecule, with a cyclic acid anhydride corresponding to its hydroxyl equivalent. The acid monomers are an alkylene oxide derivative of acid anhydride-carboxylated (meth)acrylic acids, a caprolactone derivative of acid anhydride-carboxylated (meth)acrylic acids, a monoglycidyl ether derivative of acid anhydride-carboxylated (meth)acrylic acids, an acid anhydride-carboxylated methylol (meth)acrylic amide, etc. The acid anhydride includes succinic anhydride, maleic anhydride, dodecylsuccinic anhydride, phthalic anhydride, tetrahydrophthalic anhydride, etc. Maleic anhydride is useful because of its less polymerizability per se and even after ring-opening esterification and because of its less polymerization with (meth)acrylates.

The aforementioned acid monomer can be synthesized from a compound having one double bond and at least one hydroxyl group in one molecule by addition of a cyclic acid anhydride in an equimolar amount in view of the hydroxy group of the compound followed by heating for a determined period to introduce the carboxyl group. The anhydride to be used for the introduction of the carboxyl group includes saturated aliphatic dicarboxylic anhydrides such as succinic anhydride and the like, unsaturated aliphatic dicarboxylic anhydrides such as maleic anhydride, itaconic anhydride and the like, alicyclic dicarboxylic anhydrides such as tetrahydrophthalic anhydride, hexahydrophthalic anhydride and the like, aromatic dicarboxylic anhydrides such as phthalic anhydride, naphthenic anhydride and the like, tricarboxylic anhydrides such as trimellitic anhydride and the like.

Furthermore, acrylic acid dimers and acrylic acid trimers produced as by-products in the synthesis of an acrylic acid monomer can be used as acid monomers as they are.

The acid monomers wherein an acid group (other than a carboxyl group) is capable of forming a water-soluble homopolymer with an alkali metal salt are phosphoric acid mono- or di-esters such as mono(meth)acryloxyethylphosphate, (meth)acryloxyethylphosphorylphenyl, di(meth)acryloxyethylphosphate and the like, sulfonic esters such as (meth)acryloxyethylsulfonate, di(meth)acryloxyethylsuccinylsulfonate and the like.

The above-mentioned acid monomer may be used singularly or in a mixture of 2 or more, depending on desired final physical properties of the cured film and its amount to be used may also be determined with the similar consideration.

The ingredient (C) for the present vehicle mixture in the radiation-curable ink composition according to the present invention is a double bond-containing polycarboxylic ester wherein 2 to 10 acid groups are present and at least 2 double bonds are pendent from the carboxylic ester having 2 to 10 acid groups.

The double bond-containing polycarboxylic ester having 2 to 10 acid groups and having at least 2 pendent double bonds in a molecule is regarded, in general, as an "acid oligomer". A homopolymer of the said acid oligomer and/or a copolymer with higher contents of the said acid oligomer have(has) a high cross-linking density and a capability of forming a water-swelling alkali metal salt. Its alkali metal salt also has the characteristics of swelling with water absorption.

As well as in the case of the above-mentioned acid monomer, a preferred double bond-containing group in this acid oligomer is a methacryloyl or acryloyl group in view of its higher radiation-curing ability. Also, the same concept is applicable to the oligomer's acid group which is capable of forming an alkali metal salt. Examples of such acid groups are carboxyl groups, sulfonyl groups and phosphoryl groups and the like but carboxyl is rather popular. While the number of the acid group actually used in the application for the present invention ranges from 1 to 10, the number has to be determined by the molecular weight of the acid oligomer but it is practical, in view of availability, to adopt 2 to 6 for the acid oligomer to be economically synthesized. The acid oligomer is so-called polyfunctional wherein the number of double bonds (number of functional groups) in a molecule is more than 2. The above-mentioned acid oligomer having 2 to 6 functional groups are used in many cases.

The acid oligomer is synthesized through a reaction of an epoxy-acrylate or methacrylate obtainable by ring-opening esterification of a poly-epoxy compound and an acrylic acid or methacrylic acid as starting materials, with a cyclic acid anhydride to introduce a carboxyl group.

The epoxy-(meth)acrylates includes aliphatic epoxy-(meth)acrylates such as (meth)acrylic acid derivatives of neopentyl glycol diglycidyl ether, (meth)acrylic acid derivatives of 1,6-hexanediol diglycidyl ether, (meth)acrylic acid derivatives of trimethylol propane triglycidyl ether, and the like; aromatic epoxy-acrylates such as (meth)acrylic acid derivatives of bisphenol A glycidyl ether, (meth)acrylic acid derivatives of epoxyphenolnovolak, (meth)acrylic acid derivatives of phthalic acid glycidyl ether, and the like.

The cyclic acid anhydride to be used for the purpose of introducing a carboxyl group into the epoxy-acrylate, may include succinic anhydride, maleic anhydride, dodecynyl succinic anhydride, phthalic anhydride, trimellitic anhydride, tetrahydrophthalic anhydride, hexahydrophthalic anhydride and the like. The products thus created are pendented in a half-esterified form of hydroxyl groups in the epoxy-acrylate by the acid anhydride.

The acid oligomer my be used singularly or in a mixture of more than 2 types. The amount of application of the acid oligomer is determined depending upon the performance required for the ultimate physical properties of cured film of this ink composition. Taking this point in terms of acid value, the mixing ratio and mixing amount must be determined so that the acid value of whole vehicle may be from 5 to 100, preferably in the range of 20 to 50.

The ingredient (D) for the present vehicle mixture in the radiation-curable ink composition according to the present invention is at least one ingredient selected from the group consisting of (a) a double bond-containing fluorinated carboxylic ester, (b) a block copolymer comprising a fluorinated alkyl group-containing polymer segment and a (meth)-acrylic polymer segment, (d) a block copolymer comprising a siloxane group-containing polymer segment and a (meth)-acrylic polymer segment, and mixtures thereof.

The water-repellent double bond-containing fluorinated carboxylic esters wherein the fluorine component in the copolymer is oriented on the surface of the copolymer molecule include fluorinated alcoholic residue-containing esters such as trifluoroethyl (meth)acrylate, tetrafluoropropyl (meth)acrylate, octafluoropentyl (meth)acrylate, heptadecafluorodecyl (meth)acrylate and the like as well as fluorinated macro-monomers wherein the base chain has a fluorine group and the side chain is pendented with an acryloyl group, such as UNIRESIN[198] series products manufacturered by Shin-Nakamura Kagaku Kogyo Co., Japan.

These double bond-containing fluorinated carboxylic esters form a film wherein the fluorine components in these double bond-containing fluorinated carboxylic esters are oriented on the surface thereof, to give the film water-repellency, chemical resistance and soil resistance. Furthermore, the film has the effect of facilitating penetration of an aqueous alkaline solution along the interface between the cured ink film and the base since polar groups are pushed toward the base.

The double bond-containing fluorinated carboxylic ester is combined in the range of 1 to 20 parts by weight per 100 parts of vehicle, and preferably 3 to 10 parts or so.

In cases where the amount of the double bond-containing fluorinated carboxylic ester is insufficient, the chemical resistance, repellency and soil resistance of the ink surface is adversely affected, thus making it difficult to maintain the value of the printed product at the distribution stage. In cases where it is excessive, the ink has deteriorated recoating ability, which makes multi-color printing difficult. Since such ink will be too water-repellent, it is much detrimental to the infiltration of an aqueous alkaline solution for ink removal, thus lowering work efficiency.

In the case of the block copolymer made of a fluorinated alkyl group-containing polymer segment and a (meth)-acrylic polymer segment (fluorine-containing block copolymer), the (meth)acrylic copolymer segment is dissolved, on the contrary, in the radiation-curable vehicle taking advantage of the high degree of surface orientation of the fluoro group contained in the molecule and eventually caught firmly within the hardened substance after curing. Therefore, the cured film will get durable water-repellency, chemical resistance, soil resistance and abrasion resistance and, concurrently, the polar group in the vehicle is condensed at the side of the base, thus improving the effect on infiltration of an aqueous alkaline solution along the interface between the hardened film and the base.

On the (meth)acrylic polymer segment contained in the fluorinated block copolymer, various functional group such as an amino group, alkylamino group, epoxy group, hydroxyl group, carboxyl group etc. can be introduced by selection of (meth)acrylic monomers. The fluorinated block copolymer carrying those functional groups can be optionally selected and utilized depending upon the physical properties required for the film product. When the acid group capable of forming an alkali metal salt, like a carboxyl group, is included, the application amount is limited in the range of acid values such as from 5 to 100. Otherwise it may affect the acid value of the vehicle.

These fluorinated block polymers are, for example, Modiper F198 series products manufacturered by Nippon Yushi Co., Japan. The actual application amount of the fluorinated block polymer is 1 to 10 parts by weight per 100 parts by weight of the vehicle, but preferably about 3 to 7 parts. A predetermined amount of the fluorinated block polymer is dissolved beforehand in the ingredient (F) which will ultimately constitute the vehicle composition, followed by addition to the vehicle.

The block copolymer consisting of a siloxane group-containing polymer segment and a (meth)acrylic polymer segment (siloxane-containing block copolymer) can be used since it indicates good surface orientation. This siloxane-containing block copolymer is capable of affording not only water-repellency but also detachment ability from the mold and abrasion resistance as it indicates better surface orientation similar to those of the fluorine-containing block copolymer. Although the water-repellency of the siloxane-containing block copolymer is not as strong as that of the fluorine-containing block copolymer, it has excellent abrasion resistance, and the cured ink film using it has a special feature that prevents any scratches during distribution processes of the printed products. Furthermore, it will be effective for the removal of the film with an aqueous alkaline solution as intended by the present invention.

In the case of the siloxane-containing block copolymer, various polar groups as well as mentioned above in the case of fluorinated block polymer can be introduced into a (meth)acrylic polymer segment by selecting a (meth)acrylic monomer. These may be optionally selected and used depending upon the physical film properties ultimately required.

The siloxane-containing block copolymers are, for example, Modiper-FS198 series products manufacturered by Nippon Yushi Co., Japan. The application amount thereof is in the range of 0.05 to 10 parts by weight in 100 parts of the vehicle but preferably 1 to 5 parts by weight under normal circumstances. While it is somewhat inferior in water-repellency to the fluorine-containing block copolymer, an increase in the amount is not necessary to make it up; instead, it is desirable to avoid possible deterioration of recoating ability when using larger amounts. A predetermined amount of this siloxane-containing block copolymer is dissolved beforehand in the ingredient (F) which will ultimately constitute the vehicle composition, followed by addition to the vehicle.

The fluorine-containing block copolymer and/or siloxane-containing block copolymer can be used in combination with the double bond-containing fluorinated carboxylic ester in a composition comprising either two or three of them. In such a case, a synergetic effect including the excellent water-repellency of the siloxane-containing compound and the excellent abrasion resistance of the siloxane-containing block copolymer can be obtained upon combining the two compounds but in the case of such a combination, the amount of the fluorine-containing compound shall be 2 to 4 times that of the siloxane-containing block copolymer so that the intended purpose may be satisfied to the best extent. In the case of such a combination, the overall application amount may be 1 to 10 parts by weight per 100 parts of vehicle, most preferably in the range of 3 to 7 parts by weight.

The ingredient (E) for the present vehicle mixture in the radiation-curable ink composition according to the present invention is a double bond-containing carboxylic ester, having at least 2 double bonds and free of an acid group, provided that this carboxylic ester is excluded from the above-mentioned ingredient (A).

The double bond-containing polycarboxylic esters having no acid group which are excluded from the ingredient (A) are sold commercially as conventionally called a "polyfunctional monomer" or a "polyfunctional oligomer". Typical of those polyfunctional monomers are dihydric alcohol di(meth)acrylates such as ethylene glycol di(meth)acrylate, triethylene glycol di (meth)acrylate, tripropylene glycol di (meth)acrylate, 1,4-butanediol di(meth)acrylate, 1,6-hexanediol di(meth)acrylate, neopentyl glycol di(meth)acrylate, hydroxypivalic acid neopentyl glycol di(meth)acrylate, ethylene oxide-modified bisphenol A di (meth)acrylate, dicyclopentanyl di(meth)acrylate and the like, trihydric alcohol tri(meth)acrylates such as trimethylol ethane tri(meth)acrylate, trimethylol propane tri (meth)acrylate, glycerine tri (meth)acrylate, tris[(meth)acryloxyethyl]isocyanurate and the like; polyhydric alcohol (meth)acrylates such as pentaerythritol tetra(meth)acrylate, ditrimethylol propane tetra(meth)acrylate, dipentaerythritol hexa(meth)acrylate and the like. It can be allowed to contain partially unesterified hydroxy groups upon esterification of trihydric or polyhydric alcohols with (meth)acrylic acids. It can be also allowed to have hydroxy groups produced upon ring-opening esterification of epoxy groups with (meth)acrylic acids.

The polyfunctional oligomers are oligomers excluding the double bond-containing linear polyester oligomers and/or polymers defined as the ingredient (A). Typical of those polyfunctional oligomers are epoxy (meth)acrylate, urethane (meth)acrylate, polyester (meth)acrylate, polyether (meth)acrylate, polybutadiene (meth)acrylate, and the like.

Among epoxy (meth)acrylate, most conventional examples are a bisphenol-type compound of the formula (1):

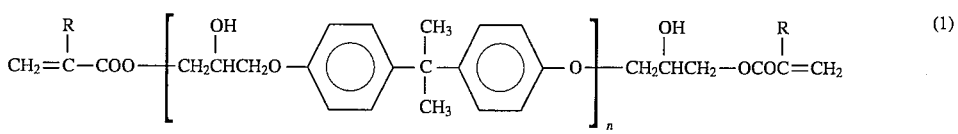

wherein n is 1 to 4 and R is H or CH$_3$, and those wherein the bisphenol skeleton is substituted with bisphenol A, bisphenol F, bisphenol S or the like in the aforementioned formula (1). A phenolnovolak-type epoxy (meth)acrylate having the folumula (2):

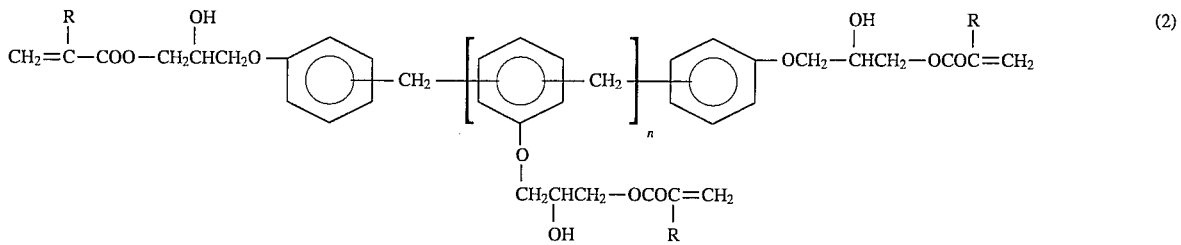

wherein n is 1 to 4 and R is H or CH$_3$, can be used.

The oligomers include aliphatic epoxy (meth)acrylates such as epichlorohydrin-modified (poly)alkylene glycol di(meth)acrylates and epoxylated soy bean oil (meth)acrylates, alicyclic epoxy (meth)acrylates such as a compound of the formula (3):

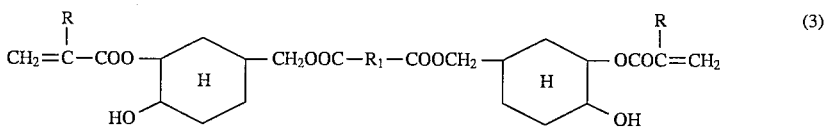

wherein R is H or CH$_3$ and R$_1$ is a residue derived from dicarboxylic compounds by exclusion of -COOH groups therefrom, depending on demand.

The urethane (meth)acrylate includes a compound having the formula (4):

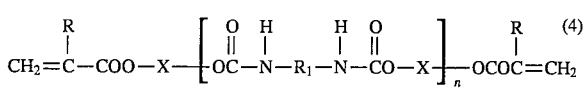

wherein n is 1 to 4, R is H or CH$_3$, R$_2$ is a residue derived from diisocyanates by exclusion of -NCO groups therefrom, and X is a residue derived from polyols by exclusion of OH groups therefrom, and the like.

In the formula (4), the isocyanates include aromatic diisocyanates such as trilene diisocyanate, 4,4-diphenylmethane diisocyanate, xylylene diisocyanate and the like, aliphatic diisocyanates such as hexamethylene diisocyanate, trimethylhexamethylene diisocyanate and the like, alicyclic diisocyanates such as isophorone diisocyanate, methylene bis(4-cyclohexylisocyanate) and the like and the polyols include glycols such as ethylene glycol, propylene glycol, 1,4-butanediol, 1,6-hexanediol, polyglycol ethers, bisphenol ethers such as ethoxylated bisphenol A and the like, spiro glycol, caprolactone-modified diols, carbonated diols and the like.

The urethane (meth)acrylate can be selected from those sold commercially and synthesized by methacrylating or acrylating the terminus of a urethane prepared by combination of the diisocyanate with the polyol.

The polyester (meth)acrylate is a compound of the formula (5):

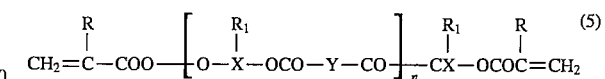

wherein n is 1 to 5, R is H or CH$_3$, R$_1$ is H or CH$_2$=C(R)COO- , X is a residue derived from polyols by exclusion of OH therefrom, Y is a residue derived from dicarboxylic compounds by exclusion of -COOH groups therefrom, etc. A number of such compounds are commercially available and can be selected from those known in the art, depending on requirements.

The polybutadiene (meth)acrylates include those synthesized by methacrylating or acrylating a liquid polybutadiene having at least two terminal hydroxyl groups, and those wherein the hydroxyl group is coupled with a (meth)acrylic ester having a hydroxyl group by using a diisocyanate. Typical of those are commercially available chemicals such as Quinbeam-101™(Nippon Zeon, Japan), TE™resins (Nippon Soda, Japan), and MIKERON NU-A™(Hayakawa Rubber, Japan).

The purpose of using the polyfunctional monomer and/or oligomer is to create three-dimensional cross-linking when polymerization is conducted with radiation and to afford film hardness, gloss, water-tightness, chemical resistance and abrasion resistance.

The above-mentioned polyfunctional monomer and/or oligomer may be used independently but in many cases a mixture including two or more types is added as the vehicle component. The application amount is determined in consideration whether the cross-linking density during the curing process is satisfactory in addition to the other considerations of physical properties thereof such as solubility and viscosity as well as the other vehicle ingredients. Further in accordance with the intended purpose, adjustment of acid values of the vehicle will also be one restrictive condition on the determination of application amount in order to achieve the elimination with alkali (which is the very subject of the present invention). In many cases, 5 to 20 parts by weight of the polyfunctional monomer and/or oligomer per 100 parts of the vehicle is used, but in case of excessive application, removable stress may occur due to cross-linking contraction during a curing process and the ability of adhering to the base may be hampered.

The ingredient (F) for the present vehicle mixture in the radiation-curable ink composition according to the present invention is at least one ingredient selected from the group consisting of a one double bond-containing carboxylic ester free of an acid group; a one double bond-containing carboxylic amide free of an acid group; a one double bond-containing carboxylic imide free of an acid group; and mixtures thereof.

The double bond-containing carboxylic ester and/or amide and/or imide having a single radiation-curable double bond and free of an acid group in a single molecule is called a "monofunctional monomer" among monomers contained in the radiation-curable type resin compositions. The monofunctional monomer is used mainly as a diluent to adjust viscosity in the composition. A number of monofunctional monomers are known in the art. Typical of those monofunctional monomers are 2-ethylhexyl (meth)acrylate, cyclohexyl (meth)acrylate, dicyclopentanyl (meth)acrylate, benzyl (meth)acrylate, phenoxyethyl (meth)acrylate, tolyloxyethyl (meth)acrylate, ethoxyethyl (meth)acrylate, ethylcarbitol (meth)acrylate, isobornyl (meth)acrylate, methoxypropylene glycol (meth)acrylate, acryloylmorpholine, N-vinylpyrrolidone, N-vinylcaprolactam, N,N-diethylaminoethyl (meth)acrylate, t-butylaminoethyl (meth)acrylate, etc.

Furthermore, the adhesiveness of the monofunctional monomer is remarkably improved when it includes a polar group such as a hydroxyl group, epoxy group, phosphoric ester group and the like in its molecule, which may be utilized to the extent not to deteriorate water-tightness in the present invention.

Such monofunctional monomers include 2-hydroxyethyl (meth)acrylate, 2-hydroxypropyl (meth)acrylate, 3-butoxy-2-hydroxypropyl (meth)acrylate, caprolactone-modified 2-hydroxyethyl (meth)acrylate, 3-phenoxy-2-hydroxypropyl (meth)acrylate, glycidyl (meth)acrylate, ethylene oxide-modified butoxylated phosphoric acid (meth)acrylate, etc.

These monofunctional monomers are applied alone or in admixture with two or more components. The amount of monomer can vary between 5 and 40 parts per 100 parts of the ink vehicle. The viscosity may be conventionally controlled between 10 and 30 parts of the monofunctional monomers.

The aforementioned ink vehicle components are mixed in the desirable ratio determined through experiments to produce ink vehicles. The composition ratio is determined by adjusting the acid value from about 5 to 100 in order to achieve the prime purpose of the present invention which is to remove the ink with an aqueous alkaline solution. In producing the ultra-violet-curable type ink by using the vehicle so obtained, a photopolymerization initiator, a photosensitizer, an organic and/or inorganic pigment and other additives can be added, but when applying EB (electron beam) curing, the photopolymerization initiator and the photosensitizer are not necessary.

A number of photopolymerization initiators which can be used in ultraviolet-initiated polymerization are known in the art. Typical of those available initiators include benzophenone, diethoxyacetophenone, 1-hydroxycyclohexyl phenyl ketone, 2-methyl-(4-methylthiophenyl)-2-morpholinopropan-1-one, benzoylalkyl ether, benzil, benzildimethylketal, camphorquinone, 2-ethylanthraquinone, methyl benzoylbenzoate, 4-phenylbenzophenone, 3,3'-dimethyl-4-methoxybenzophenone, thioxanethone, 2,4-diethylthioxanthone, methyl phenylglyoxylate, benzoylphosphine oxide, 1-trimethylbenzoyldiphenylphosphine oxide, etc.

Typical of known photosensitizers are triethanolamine, methyldiethanolamine, triisopropanolamine, 4,4-diethylaminobenzophenone, ethyl 4-dimethylaminobenzoate, n-butoxyethyl 4-dimethylaminobenzoate, isoamyl 4-dimethylaminobenzoate, and the like.

The above-mentioned photopolymerization initiator may be used alone but, in many cases, its photopolymerizability is improved in a combined use with the photosensitizer. The most suitable photo-polymerization initiator and photosensitizer can be selected depending upon the vehicle composition to be applied. The standards applicable to such selection is curing speed, coloration during curing processes, existence of combined use of pigment, strength of odor after curing and the like, which is modified upon studies reflecting respective purposes. The application amount is possibly in the range of 1 to 20 parts by weight for the photo-polymerization initiator and photosensitizer respectively as against the ink vehicle as a whole but it is not preferable to use a large amount in view of the resultant effect that the molecular weight will not increase and the strength of the cured film will deteriorate and undesirable strong odor will be generated though curing progress will get accelerated. The most preferable application range is 2 to 10 parts by weight in combination use of both of them. In such case, the amount ratio between the photopolymerization initiator and photosensitizer to be required varies depending upon the type and composition of the vehicle available. Also, in the case of ink containing an additional coloring pigment described below, the said ratio has to be changed reflecting the unique ultraviolet absorption ability of the pigment.

The pigment is roughly classified into an organic pigment and an inorganic pigment according to the chemical composition. It can be also classified into a colored pigment and a colorless pigment (extender) in view of the application. With reference to the radiation-curing, the role of the end use classification is more important.

Among the colored pigments, the inorganic pigments include white pigments such as white lead, zinc oxide, zinc sulfide, titanium dioxide and the like, blue pigments such as ultramarine blue, iron blue, cobalt blue and the like, green pigments such as chromium oxide, verdian, chrome green and the like, chrome yellow, titan yellow, iron oxide yellow, molybdate orange, cadmium pigments, yellow to red pigments such as red oxide, black pigments such as iron black, titan black, carbon black and the like, metal pigments such as aluminium powder and bronze powder, pearl pigments such as mica. However, there are many types of the inorganic pigment which can not be used for sanitary reasons. Thus, a harmless one is selected out of the above-mentioned pigments. The organic pigments include monoazo-pigments, diazo-pigments, condensed azo-pigments, indanthrone pigments, indigo pigments, thioindigo pigments, quinacridone pigments, phthalocyanine pigments, dioxazine pigments, isoindolinone pigments, pyrrolopyrrole pigments and the like. It is desirable to select the pigment with fast color having strong light resistance in compliance with the radiation curing method.

The application amount of the above pigments varies depending on the intended color depth but in most cases it falls in the range of 0.5 to 50 wt % per total ink composition volume. While the amount is restricted by coloring strength, being the pigment specificity, the amount ranges from 15 to 60 wt % in the case of titanium dioxide (representative white pigment), and from 3 to 6 wt % in the case of carbon black (black pigment). In the case of an organic pigment, 3 to 10 wt % is desirable in order to attain distinct color and 4 to 6 wt % is desirable when curing is conducted with ultraviolet radiation. Generally speaking, the vehicle according to the present invention has better dispersing ability since it contains many polar groups like a carboxyl group. However, in order to achieve still better coloration, a large amount of pigment is combined with the vehicle which includes a small amount of pigment dispersing agent, thus creating a condition physically susceptible to crushing pressure by utilizing improvement in the viscosity owing to its oil absorption, followed by sufficiently kneading with the conventional medium dispersing equipment in the coloring material production industry, such as a ball mill or roll mill. When the ink is composed by mixing, the resultant dispersed pigment (toner) in a high concentration is adjusted with the additional vehicle to meet the predetermined pigment density.

For the radiation-curable type ink component employed in the present invention, which is detachable with alkali, various colorless pigments (extenders) my be utilized for the purpose of maintaining the special feature as a printing ink such as viscosity, fluidity and thixotropy, of maintaining and increasing ink thickness, and of affording contraction buffer while curing, surface dull-finishing, and slipperiness, as well as of improving film strength. The popular extenders include inorganic types such as talc, kaolin, silica, precipitated barium sulfate, precipitated calcium carbonate, alumina white, white carbon and the like, and waxes such as polyethylene wax, polypropylene wax, polyfluorinated polyethylene wax and the like, and fine powders of artificial and/or natural polymers such as a polyamide resin, polyimide resin, melamine resin, or benzoguanamine resin, cellulose, collagen and the like. The amount of those pigments may be optionally determined in compliance with the respective purpose. A surfacer and/or defoamer may be included in the radiation-curable type ink composition according to the present invention which is detachable with alkali in order to adjust the finishing condition of the cured film. These agents shall be selected from the various types of surfacers and defoamers available in the market through experiments as to whether they are well compatible to the vehicle composition and provide surface smoothness. Application types or amounts thereof never impose a restriction on the contents of the ink composition according to the present invention, and they may be determined from time to time but normally as a total amount of the surfacer and/or defoamer, they are used in an amount of from 0.5 to 5 wt % per overall volume of ink.

In addition, an ultraviolet absorbing agent, a wetness improving agent, an anti-oxidizing agent and the like my be employed as the case may be.

The ink using the radiation-curable type ink composition according to the present invention which is detachable with alkali after curing is used mainly for a screen printing method but it my be useful in other applications such as other printing methods such as flexography and gravure printing when it is adjusted to have less viscosity with the help of an organic solvent or a mixture thereof.

The cured printings with the radiation-curable type ink having a removable nature by alkaline water on polyethylene terephthalate resins can be easily removed by dipping the printings in an aqueous strong alkaline solution such as sodium hydroxide and potassium hydroxide for a short time and no drastic treatment such as hydrolysis on polyethylene terephthalate is required. For removal, there are several steps ranging from dissolving detachment to filmy detachment, which make it possible to attain the intended performance by controlling the amount ratio of (B), (C) and (D). In any case, selection of detachment conditions is determined considering the method of waste treatment after removal. After detachment the polyethylene terephthalate resin can be recovered in a condition clean enough for regeneration and re-use through rather a simple method such as washing with water and drying.

While the condition for detaching the ink composition by alkali varies depending the ratio of weight of (B), (C) and (D), it is preferable to have alkaline concentration at 5% or more, temperature at 70° C. or more and duration for 5 minutes or more. However, it may be practical to use an alkaline concentration of 1% and a temperature of 50° C. by applying an extended time of immersion in an alkaline solution or immersion while brushing the printed surface, or by controlling the ratio of (B), (C) and (D), or by reflecting additional conditions brought by the printing and curing processes and the like.

When the alkali removing treatment is adopted on a commercial scale, it my be performed by the selective application of those conditions.

The method for printing letter, design, figure and the like with the above-mentioned printing ink includes a silk-screen printing method. In this method, in general, a silk-screen with the range of 252 to 330 mesh is normally utilized. A roughened surface of the plastic product may be preferably printed with the printing ink.

Further, the ultraviolet radiation used on the printing surface with the printing ink containing the said radiation-curable resin vehicle is conducted normally using a high pressure mercury-vapor lamp or metal halide lamp and the like, wherein its wavelength is 200 to 450 nm or so. The integrated ultraviolet exposure is preferably in the range of 100 to 500 mj/cm$^2$. Also, in the case of electron radiation, the radiation amount is normally in the range of 10 to 100 KGy, preferably in the range of 30 to 60 KGy.

The method for printing the plastic product is first to carry out printing with the ink of the radiation-curable type composition according to the present invention, and then to harden the radiation-curable ingredients in the printing ink by applying radiation to the printed surface.

For the thermoplastic resin product, various resin products such as polyester resin products and polyolefin resin products can be utilized but, among all, the polyethylene terephthalate product is particularly preferable. The polyethylene terephthalate which can be used in the present invention stands for polyester having ethylene terephthalate repeating units, which comprises basically terephthalic acid as the acid content and ethylene glycol as the glycol content, but may contain at least one acid component and at least one glycol component for copolymers. The acid component may include isophthalic acid, diphenyl ether-4,4',-dicarboxylic acid, naphthalene-1,4- or -2,6-dicarboxylic acid, adipic acid, sebacic acid, decane-1,4-dicarboxylic acid, hexahydroterephthalic acid, and the like. The glycol component my include propylene glycol, 1,4-butanediol, neopentyl glycol, diethylene glycol, polyethylene glycol, polypropylene glycol, polytetramethylene glycol, cyclohexanedimethanol, 2,2-bis(4-hydroxyphenyl)propane, 2,2-bis(4-hydroxyethoxyphenyl)propane, p-hydroxybenzoic acid, and the like. These acid and glycol components my be each mixed within the range of less than 50 wt % for each content in the copolymer content as a whole.

The polyethylene terephthalate may contain additives such as a coloring agent, an ultraviolet-absorbing agent and an anti-static agent in an appropriate proportion as the case may be.

The polyethylene terephthalate product includes containers made of, as starting materials, saturated polyesters such as polyethylene terephthalate by molding.

The containers to be used in the method for printing on the surface of a container body include polyester containers obtained by processes such as hollow molding, blow molding with double axle extention or injection molding and the like.

The following working examples and preparation examples are intended to illustrate the invention in further detail and should by no means be construed as limiting the scope of the invention.

PREPARATION EXAMPLE 1

A double bond-pendent linear polyester oligomer and/or polymer which can be used in the following Working Examples is prepared by urethane-acrylating the copolymerized polyester polyols of the following composition (1) with the following compositions (2):

| (1) Copolymerized polyester polyol | | |
|---|---|---|
| | A | B |
| (Dicarboxylic acid components) | | |
| Terephthalic acid | 30 | 50 |
| Isophthalic acid | 30 | 50 |
| Orthophthalic acid | 40 | — |
| (Glycol components) | | |
| Ethylene glycol | 55 | 50 |
| Neopentyl glycol | 45 | 50 |
| Molecular weight of copolymer | 1900 | 3000 |
| | (part by weight) | |

| (2) A double bond-containing oligomer and/or polymer | | |
|---|---|---|
| | A-1 | B-1 |
| (Copolymerized polyester polyol components) | | |
| A | 100 | |
| B | | 100 |
| (Polyisocyanate components) | | |
| Isophorone diisocyanate | 28 | 27 |
| (Hydroxyl group-containing methacrylic or acrylic esters) | | |
| Pentaerythritol triacrylate | | 40 |
| 2-Hydroxyethyl acrylate | 13 | |
| Molecular weight | 2500 | 3600 |
| | (part by weight) | |

PREPARATION EXAMPLE 2

A double bond and carboxyl group-containing carboxylic ester is prepared as follows:

(a)

Bisphenol A glycidyl ether (190.0 g, 190.0 epoxy equivalents), acrylic acid (75.0 g, 1.05 mol), dimethylbenzylamine (2 g) and p-methoxyphenol (0.2 g) were placed in a flask equipped with a thermometer, stirrer and reflux condenser and dissolved homogeneously followed by heating to 80° C. and standing for 24 hours to afford an epoxy acrylate with 10.3 acid value. Then, the product was reacted with phthalic anhydride (140.6 g, 0.95 mol) and the mixture stood at 80° C. for 5 hours to produce a bisphenol A epoxy acrylate-phthalic ester (viscous pale yellow product, 130.7 acid value).

(b)

Epoxy novolak resins (190.0 g, 190.0 epoxy equivalents), acrylic acid (75.0 g, 1.05 mol), tetramethylammonium chloride (2.0 g) and p-methoxyphenol (0.2 g) were placed in a container similar to the above (a) and dissolved homogeneously followed by heating to 80° C. and standing for 24 hours to afford an epoxy acrylate with 10.5 acid value. Then, the product was reacted with succinic anhydride (95 g, 0.95 mol) and the mixture stood at 80° C. for 5 hours to produce an epoxy novolak acrylatesuccinic ester (viscous pale yellow product, 145.2 acid value).

(c)

Glycerine triglycidyl ether (150.0 g, 150.0 epoxy equivalents), acrylic acid (75.0 g, 1.05 tool), tetrabutylphosphonium bromide (2.0 g) and p-methoxyphenol (0.2 g) were placed in a container similar to the above (a) and dissolved homogeneously followed by heating to 80° C. to afford an epoxy acrylate with 9.5 acid value. Then, the product was reacted with hexahydrophthalic anhydride (145 g, 0.95 mol) and the mixture stood at 80° C. for 5 hours to produce a glycerine epoxy acrylate-hexahydrophthalic ester (viscous pale yellow product, 141.3 acid value).

WORKING EXAMPLE 1

The double bond-containing oligomer obtained in Preparation Example 1, B-1 (24.4 g), an aliphatic urethane hexaacrylate (7.8 g, Daicel UCB Ebecryl '1290K), a fluorine-containing macro-monomer (25.7 g, Shin-Nakamura Kagaku Kogyo Co. UNIRESIN ™FC-300), monoacryloyloxyethyl phthalate (6.3 g), the bisphenol A epoxy acrylate-phthalic ester obtained in Preparation Example 2, (a) (3.2 g), trimethylol propane triacrylate (2.0 g), phenoxyethyl acrylate (14.2 g), and acryloylmorpholine (16.4 g) were mixed to give a vehicle mixture with 17.6 acid value.

One hundred parts of the vehicle were admixed with 15 parts of mistrone vapor talc, 10 parts of benzildimethyl ketal, 5 parts of dimethylaminobenzoic acid ethyl ester, 3 parts of polyethylene wax powders and 1 part of a surfacer, BYK-306™(Byk-Mallinckrodt Chemische Produkte GmbH) and 0.1 part of a thermal polymerization inhibitor, phenothiazine and the mixture was treated by a roll mill to produce a colorless ink with dispersion particle sizes of less than 5 microns.

An untreated polyethylene terephthalate sheet was screen printed with the ink thus obtained by means of a 300 mesh Tetron™screen and the printed product was radiated with a 120 W/cm metal halide lamp to the extent of integrated ultraviolet exposure of 200 mj/cm$^2$ to obtain a cured film. The film so prepared did not show any sign of exfoliation at a peel-off test with a cellulose adhesive tape but it showed close adhesion to the base.

When the cured film prepared under the same condition was kept in a 2% aqueous solution of sodium hydroxide at 70° C. for 20 minutes, the cured film detached in a filmy form and no trace of prints was observed on the polyethylene terephthalate base.

WORKING EXAMPLE 2

The double bond-containing oligomer obtained in Preparation Example 1, B-1 (177 g) was dissolved in 118 g of phenoxyethyl acrylate, and the resultant solution was mixed with a pigment disperser (1.5 g, SOLSPERSE™24000/SOLSPERSE™5000=4/1, manufactured by ICI, Great Britain), followed by addition of Heliogen Blue-L-7080™(52.3 g, manufactured by BASF). The mixture was kneaded extensively with a roll mill to produce toners with dispersion particle sizes of less than 5 microns.

The toners thus obtained (41.6 g) were well mixed with dipentaerythritol hexaacrylate (8.4 g), trimethylol propane triacrylate (4.6 g), trimethylol propane triepoxy-acrylate (4.6 g), monoacryloyloxyethyl phthalate (8.7 g), the glycerine epoxy acrylate-hexahydrophthalic ester obtained in Preparation Example 2,(c)(2.2 g), octafluoropentyl acrylate (8.8 g), and acryloylmorpholine (21.0 g) to give colored ink vehicles (with 21.5 acid value).

One hundred parts of the colored ink vehicle were admixed with 3.0 g of a photopolymerization initiator, diethylthioxanthone, 3.0 g of a photosensitizer, isoamyl 4-dimethylaminobenzoate, 35 g of precipitated barium sulfate, 3 g of fluorinated polyethylene wax, 2 g of a surfacer (VERSA-FLOW BASE™manufactured by Shamrock Chemicals Corp.), 0.04 g of a thermal polymerization inhibitor, p-methoxyphenol and well mixed by stirring followed by kneading by a roll mill to give a homogenous blue ink.

An untreated polyethylene terephthalate sheet was screen printed with the ink thus obtained in the same manner as described in Working Example 1 and the printed product was radiated with a 120 W/cm metal halide lamp to the extent of integrated ultraviolet exposure of 300 mj/cm$^2$ to obtain a cured film. The film so prepared did not show any sign of exfoliation at a peel-off test with a cellulose adhesive tape but it showed close adhesion to the base.

When the cured film prepared under the same condition was kept in a 2% aqueous solution of sodium hydroxide at 70° C. for 20 minutes, the cured film detached in a filmy form and no trace of prints was observed on the polyethylene terephthalate base.

WORKING EXAMPLE 3

The double bond-containing oligomer obtained in Preparation Example 1, B-1(14.2 g), an aliphatic urethane hexaacrylate (4.9 g), a fluorine-containing macro-monomer (5.9 g), monoacryloyloxyethyl succinate (4.5 g), the epoxy novolak acrylate-succinic ester obtained in Preparation Example 2, (b) (2.5 g), trimethylol propane triepoxy-acrylate (3.9 g), tolyloxyethyl acrylate (3.9 g), phenoxyethyl acrylate (9.4 g), and acryloylmorpholine (9.8 g) were mixed to give an ink vehicle mixture with 25.8 acid value.

A pigment dispersing agent, Disperbyk-110™(0.5 g, manufactured by Byk-Mallinckrodt Chemische Produkte GmbH) was added to the ink vehicle mixture and the resultant mixture was mixed homogeneously by stirring. Then, 30.0 g of titanium oxide, TIPAQUE CR-580™(Ishihara Sangyo Kaisha Ltd., Japan), 6.0 g of a photopolymerization initiator acylphosphine oxide, 2.0 g of fluorinated polyolefin wax, 1.5 g of a surfacer, VERSA-FLOW BASE™(manufactured by Shamrock Chemicals Corp.), 1.0 g of a defoamer, AQUALEN N™(manufactured by Kyoeisha Chemicals Co., Japan), and 0.04 g of a thermal polymerization inhibitor, p-methoxyphenol were added to the mixture followed by stirring for a while and the product was kneaded by a roll mill to give an ink with dispersion particle sizes of less than 5 microns.

An untreated polyethylene terephthalate sheet was screen printed with the ink thus obtained in the same manner as described in Working Example 1 and the printed product was radiated with a 120 W/cm metal halide lamp to the extent of integrated ultraviolet exposure of 300 mj/cm$^2$ to obtain a cured film. The film so prepared did not show any sign of exfoliation at a peel-off test with a cellulose adhesive tape but it showed close adhesion to the base.

When the cured film prepared under the same condition was kept in a 2% aqueous solution of sodium hydroxide at 70° C. for 30 minutes, the cured film detached in a filmy form and floated in the solution. No trace of prints was observed on the polyethylene terephthalate base.

WORKING EXAMPLE 4

The double bond-containing oligomer obtained in Preparation Example 1, B-1 (19.6 g), phenoxyethyl acrylate (19.7 g), tolyloxyethyl acrylate (6.6 g), acryloylmorpholine (16.1 g), trimethylol propane triepoxyacrylate (6.6 g), 6 functional group-containing urethane EBECRYL™K1290 (8.2 g, manufactured by DAICEL •UCB Co., Ltd), monoacryloyloxyethyl phthalate (7.2 g), the bisphenol A epoxy acrylate-phthalic ester obtained in Preparation Example 2, (a) (2.0 g), and the block copolymer solution (14.0 g) which is prepared by mixing and dissolving acryloylmorpholine (71.0 wt %), a fluorine-containing block copolymer, Modiper F600™(20.5 wt %, Nippon Yushi Co., Japan) and a siloxane-containing block copolymer, Modiper FS700™(8.5 wt %, Nippon Yushi Co., Japan), were mixed by stirring to give homogeneous vehicles with 17.9 acid value.

Then, a pigment disperser, Anti-Terra-U™(0.2 g, manufactured by Byk-Mallinckrodt Chemische Produkte GmbH) and p-methoxyphenol (0.05 g) were dissolved in the vehicle (92.0 g) in advance, followed by dispersing Raven 450™(1.5 g, manufactured by Columbian Chemicals Co.), Raven 1350™(1.5 g, manufactured by Columbian Chemicals Co.) and Titan Black 10S™(5.0 g, manufactured by Mitsubishi Material Co., Japan) and kneading by a roll mill extensively to afford coloring vehicles with dispersion particle sizes of less than 5 microns.

To 96.5 g of the coloring vehicle were added 2.0 g of a fluorinated polyolefin wax, 0.5 g of a surfacer, BYK-306™(manufactured by Byk-Mallinckrodt Chemische Produkte GmbH) and 1.0 g of a defoamer, AQUALEN N™(manufactured by Kyoeisha Chemicals Co., Japan), and the resultant mixture was stirred extensively by a dissolver to produce a black ink for EB curing.

An untreated polyethylene terephthalate sheet was screen printed with the black ink thus obtained by means of a 330 mesh screen and the printed ink was cured in 6 Mrad (165 KV, 3.2 mA, 10 m/min. ) with an EB radiation device, CB250/15/180L™(manufactured by Iwasaki Denki Co., Japan) to form a tack-free cured coating film. The film so prepared did not show any sign of exfoliation at a peel-off test with a cellulose adhesive tape but it showed close adhesion to the base.

When the cured film was dipped in a 5% aqueous solution of sodium hydroxide at 80° C. for 5 minutes, the cured film detached in filmy form completely from the base. Neither trace of prints nor any sign of erosion by an aqueous alkaline solution was observed on the polyethylene terephthalate base.

WORKING EXAMPLE 5–8

Following the same procedures as in Working Examples 1–4, four additional radiation-curable ink compositions are prepared. Each of the liquid vehicles for the ink compositions have the following composition:

| Component | Parts by weight |
|---|---|
| Preparation Example 1 A-1 | 24.1 |
| monoacryloyloxyethyl succinate | 7.6 |
| Preparation Example 2 (b) | 4.3 |
| fluorine macromer UNRESIN FC-200 ™ | 10.0 |
| aliphatic urethane hexaacrylate | 8.3 |
| methylol propane triepoxy acrylate | 6.6 |
| tolyoxyethyl acrylate | 6.6 |
| phenoxyethyl acrylate | 15.9 |
| acryloylmorpholine | 16.6 |
| Total | 100.0 |

The liquid vehicle has an acid value of 25.8.

In producing the radiation-curable ink compositions, a pigment, dispersing agent, photopolymerization initiator, photosensitizer, surfacer, defoamer, wax and thermal polymerization inhibitor are also used, as described in Working Examples 1–4, above. The components used in Working Examples 5–8 are as follows:

| | Working Example # | | | |
|---|---|---|---|---|
| | Ex. 5 | Ex. 6 | Ex. 7 | Ex. 8 |
| | | Color | | |
| Component | White | Yellow | Red | Blue |
| Liquid vehicle | 100.0 | 100.0 | 100.0 | 100.0 |
| titanium dioxide TIPAQUE CR-580 ™ | 50.8 | | | |
| NOVAPERM RED F3RK-70 ™ (Hoechst) | | | 12.6 | |
| HELIOGEN BLUE-L-7080 ™ | | | | 12.6 |
| IRGAZIN YELLOW 2GLTE ™ (Ciba Geigy) | | 12.6 | | |
| Disperbyk-110 ™ | 0.8 | | | |
| Disperbyk-160 ™ | | 0.6 | 0.6 | 0.6 |
| acylphosphine oxide | 10.2 | | | |
| diethylthioxanthone | | 3.8 | 3.8 | 3.8 |
| isoamyl 4-dimethylamino-benzoate | | 3.8 | 3.8 | 3.8 |
| VERSA-FLOW BASE ™ | 2.5 | 1.9 | 1.9 | 1.9 |
| AQUALEN N ™ | 1.7 | 2.2 | 2.2 | 2.2 |
| fluorinated polyethylene wax | 3.4 | 2.5 | 2.5 | 2.5 |
| p-methoxyphenol | 0.05 | 0.05 | 0.05 | 0.05 |

Untreated polyethylene terephthalate sheets are screen printed and tested as in Working Examples 1–4. The sheets do not show signs of exfoliation at a peel-off test with a cellulose adhesive tape, but instead show close adhesion to the base. The cured films are then detached from the base. The films show no traces of prints or signs of erosion after dipping the cured films in a 5% aqueous solution of sodium hydroxide at 80° C. for 5 minutes.

WORKING EXAMPLE 9–12

Following the same procedures as in Working Examples 1–4, four additional radiation-curable ink compositions are prepared. The liquid vehicles for the ink compositions have the following compositions:

| | Parts by weight | |
|---|---|---|
| Component | Ex. 9 | Ex. 10–12 |
| Preparation Example 1 B-1 | 19.7 | 19.6 |
| monoacryloyloxyethyl succinate | 7.1 | 7.1 |
| Preparation Example 2 (a) | 1.9 | 2.0 |
| block copolymer solution* | 13.9 | 14.0 |
| aliphatic urethane hexaacrylate | 8.2 | 8.2 |
| trimethylol propane triepoxy acrylate | 6.7 | 6.7 |
| tolyloxyethyl acrylate | 6.7 | 6.7 |
| phenoxyethyl acrylate | 19.7 | 19.6 |
| acryloylmorpholine | 16.1 | 16.1 |
| Total | 100.0 | 100.0 |

*The block copolymer solution contains 20.5% of the fluorine block copolymer Modiper F600 ™, 8.5% of the silicon block copolymer Modiper FS700 ™, and 71.0% acryloylmorpholine.

The liquid vehicle has an acid value of 20.9 (Working Example 9) and 21.0 (Working Examples 10–12).

In producing the radiation-curable ink compositions, a pigment, dispersing agent, photopolymerization initiator, photosensitizer, surfacer, defoamer, wax and thermal polymerization inhibitor are also used, as described in Working Examples 1–4, above. The components used in Working Examples 9–12 are as follows:

|  | Working Example # | | | |
| --- | --- | --- | --- | --- |
|  |  |  | Ex. 11 | Ex. 12 |
|  | Ex. 9 | Ex. 10 | | |
|  | | Color | | |
| Component | White | Yellow | Red | Blue |
| Liquid vehicle | 100.0 | 100.0 | 100.0 | 100.0 |
| titanium dioxide TIPAQUE CR-580 ™ | 45.5 | | | |
| NOVAPERM RED F3RK-70 ™ (Hoechst) | | | 6.6 | |
| HELIOGEN BLUE-L-7080 ™ | | | | 6.6 |
| IRGAZIN YELLOW 2GLTE ™ (Ciba Geigy) | | 6.6 | | |
| Disperbyk-110 ™ | 0.8 | | | |
| Disperbyk-160 ™ | | 1.2 | 1.2 | 1.2 |
| BYK-306 ™ | 0.8 | 0.6 | 0.6 | 0.6 |
| AQUALEN N ™ | 1.5 | 1.2 | 1.2 | 1.2 |
| fluorinated polyethylene wax | 3.0 | 2.3 | 2.3 | 2.3 |
| p-methoxyphenol | 0.05 | 0.05 | 0.05 | 0.05 |

Untreated polyethylene terephthalate sheets are screen printed and tested as in Working Examples 1–4. The sheets do not show signs of exfoliation at a peel-off test with a cellulose adhesive tape, but instead show close adhesion to the base. The cured films are then detached from the base. The films show no traces of prints or signs of erosion after dipping the cured films in a 5% aqueous solution of sodium hydroxide at 80° C. for 5 minutes.

WORKING EXAMPLES 13–16

Following the same procedures as in Working Examples 1–4, four additional radiation-curable ink compositions are prepared. The liquid vehicles for the ink compositions have the following compositions:

|  | Parts by weight | |
| --- | --- | --- |
| Component | Ex. 13 | Ex. 14–16 |
| Preparation Example 1 B-1 | 26.4 | 27.7 |
| monoacryloyloxyethyl succinate | 8.1 | 7.9 |
| Preparation Example 2 (b) | 4.3 | 4.1 |
| fluorine block copolymer Modiper F600 ™ | 4.7 | 4.8 |
| trimethylol propane triepoxy acrylate | 11.5 | 11.0 |
| phenoxyethyl acrylate | 26.4 | 27.6 |
| acryloylmorpholine | 18.6 | 16.9 |
| Total | 100.0 | 100.0 |

The liquid vehicle has an acid value of 27.2 (Working Example 13) and 26.4 (Working Examples 14–16).

In producing the radiation-curable ink compositions, a pigment, dispersing agent, photopolymerization initiator, photosensitizer, surfacer, defoamer, wax and thermal polymerization inhibitor are also used, as described in Working Examples 1–4, above. The components used in Working Examples 13–16 are as follows:

|  | Working Example # | | | |
| --- | --- | --- | --- | --- |
|  |  |  | Ex. 15 | Ex. 16 |
|  | Ex. 13 | Ex. 14 | | |
|  | | Color | | |
| Component | White | Yellow | Red | Blue |
| Liquid vehicle | 100.0 | 100.0 | 100.0 | 100.0 |
| titanium dioxide TIPAQUE CR-580 ™ | 51.7 | | | |
| NOVAPERM RED F3RK-70T ™ (Hoechst) | | | 12.9 | |
| HELIOGEN BLUE-L-7080 ™ | | | | 12.9 |
| IRGAZIN YELLOW 2GLTE ™ (Ciba Geigy) | | 12.9 | | |
| Disperbyk-110 ™ | 0.9 | | | |
| Disperbyk-160 ™ | | 1.3 | 1.3 | 1.3 |
| acylphosphine oxide | 10.3 | | | |
| diethylthioxanthone | | 3.9 | 3.9 | 3.9 |
| isoamyl 4-dimethylamino-benzoate | | 3.9 | 3.9 | 3.9 |
| VERSA-FLOW BASE ™ | 2.6 | 1.9 | 1.9 | 1.9 |
| AQUALEN N ™ | 3.4 | 2.6 | 2.6 | 2.6 |
| fluorinated polyethylene wax | 3.4 | 2.6 | 2.6 | 2.6 |
| p-methoxyphenol | 0.05 | 0.05 | 0.05 | 0.05 |

Untreated polyethylene terephthalate sheets are screen printed and tested as in Working Examples 1–4. The sheets do not show signs of exfoliation at a peel-off test with a cellulose adhesive tape, but instead show close adhesion to the base. The cured films are then detached from the base. The films show no traces of prints or signs of erosion after dipping the cured films in a 5% aqueous solution of sodium hydroxide at 80° C. for 5 minutes.

What is claimed is:

1. A radiation-curable ink composition which comprises a vehicle mixture comprising:

(A) at least one ingredient selected from the group consisting of a linear polyester oligomer substantially free of an acid group and free of a polymerizable double bond on the linear polyester chain, wherein 1 to 10 double bonds are pendent from the linear polyester chain; a linear polyester polymer substantially free of an acid group and free of a polymerizable double bond on the linear polyester chain, wherein 1 to 10 double bonds are pendent from the linear polyester chain; and mixtures thereof, (B) at least one ingredient selected from the group consisting of a one double bond-containing carboxylic acid wherein the acid has at least one acid group, a carboxylic ester of the said acid, a carboxylic amide of the said acid, and mixtures thereof, (C) a double bond-containing polycarboxylic ester, wherein 2 to 10 acid groups are present and at least 2 double bonds are pendent from the carboxylic ester having 2 to 10 acid groups, (D) at least one ingredient selected from the group consisting of a double bond-containing fluorinated carboxylic ester, a block copolymer comprising a fluorinated alkyl group-containing polymer segment and a methacrylic or acrylic polymer segment, a block copolymer comprising a siloxane group-containing polymer segment and a methacrylic or acrylic polymer segment, and mixtures thereof, (E) a double bond-containing carboxylic ester, having at least 2 double bonds and free of an acid group, provided that it is excluded from the above-mentioned ingredient (A) and (F) at least one ingredient selected from the group consisting of a one double bond-containing carboxylic ester free of an acid group, a one double bond-containing carboxylic amide free of an acid group, a one double bond-containing carboxylic imide free of an acid group, and mixtures thereof, wherein the acid value of the vehicle mixture is from 5 to 100.

2. The radiation-curable ink composition according to claim 1, wherein the ink composition further comprises 0 to 20 parts by weight of a photopolymerization initiator, 0 to 20 parts by weight of a photosensitizer, and 0 to 100 parts by weight of an organic and/or inorganic pigment to 100 parts by weight of the said vehicle mixture.

3. The radiation-curable ink composition according to claim 1, wherein the ingredient (A) is selected from oligomers or polymers which contain at least one vinyl, allyl, methacryloyl, acryloyl, or crotonyl group.

4. The radiation-curable ink composition according to claim 1, wherein the ingredient (A) is at least one oligomer or polymer classified in urethane methacrylates or acrylates derived from a saturated polyester polyol compound, a polyisocyanate compound and a compound having a methacryloyl or acryloyl group and an active hydrogen group as starting compounds.

5. The radiation-curable ink composition according to claim 4, wherein the saturated polyester polyol compound is synthesized from a dicarboxylic acid component and a glycol component wherein the dicarboxylic acid component is at least one compound selected from the group consisting of an aromatic dicarboxylic acid, an aliphatic dicarboxylic acid, an alicyclic dicarboxylic acid and a heterocyclic dicarboxylic acid and the glycol component is selected from the group consisting of an alkylene glycol, a dialkylene glycol, cyclohexanedimethanol, spiro glycol, 1,4-phenylene glycol, bisphenol A ethylene oxide or polyethylene oxide, and polyethylene glycol.

6. The radiation-curable ink composition according to claim 4, wherein the polyisocyanate compound is at least one compound selected from the group consisting of 2,4-trilene diisocyanate, diphenylmethane diisocyanate, 1,3-diisocyanate methylcyclohexane, 1,4-diisocyanate methylcyclohexane, 4,4'-diisocyanate dicyclohexane, 4,4'-diisocyanate dicyclohexylmethane, and isophorone diisocyanate.

7. The radiation-curable ink composition according to claim 4, wherein the compound having a methacryloyl or acryloyl group and an active hydrogen group is at least one compound selected from the group consisting of a dihydric alcohol monomethacrylate or monoacrylate, trihydric alcohol mono- or dimethacrylate or mono- or diacrylate, polyhydric alcohol methacrylate or acrylate having at least one hydroxy group, an at least one hydroxy group-containing methacrylate or acrylate of an alcohol containing 4 or more hydroxy groups, a hydroxy group-containing compound derived from methacrylation or acrylation of a caprolactone derivative of any of the aforementioned alcohol compounds, and epoxy methacrylates or acrylates derived from a ring-opening addition of a methacrylic or acrylic acid with a glycidyl ether derivative of dihydric or polyhydric alcohols or phenolic hydroxy group-containing compounds.

8. The radiation-curable ink composition according to claim 1, wherein the ingredient (B) is at least one monomer selected from the group consisting of monomers which contains one vinyl group, allyl group, methacryloyl or acryloyl group, or crotonyl group, and one carboxyl group, sulfonyl group, or phosphoryl group.

9. The radiation-curable ink composition according to claim 1, wherein the ingredient (B) is synthesized by reacting a compound having a double bond and a hydroxyl group in the same molecule, with a cyclic acid anhydride corresponding to its hydroxyl equivalent.

10. The radiation-curable ink composition according to claim 1, wherein the ingredient (B) is at least one compound selected from the group consisting of an alkylene oxide derivative of acid anhydride-carboxylated methacrylic or acrylic acid, a caprolactone derivative of acid anhydride-carboxylated methacrylic or acrylic acid, a monoglycidyl ether derivative of acid anhydride-carboxylated methacrylic or acrylic acid, an acid anhydride-carboxylated methylol methacrylic or acrylic amide, methacryloxyethylphosphate or acryloxyethylphosphate, methacryloxyethylphosphorylphenyl or acryloxyethylphosphorylphenyl, dimethacryloxyethylphosphate or diacryloxyethylphosphate, methacryloxyethylsulfenate or acryloxyethylsulfonate, and dimethacryloxyethylsuccinylsulfonate or diacryloxyethylsuccinylsulfonate.

11. The radiation-curable ink composition according to claim 10, wherein the acid anhydride component is at least one compound selected from the group consisting of saturated or unsaturated aliphatic dicarboxylic anhydrides, alicyclic dicarboxylic anhydrides, aromatic dicarboxylic anhydrides and tricarboxylic anhydrides.

12. The radiation-curable ink composition according to claim 10, wherein the acid anhydride component is succinic anhydride, maleic anhydride, dodecylsuccinic anhydride, phthalic anhydride, tetrahydrophthalic anhydride or a mixture of at least two in these anhydrides.

13. The radiation-curable ink composition according to claim 1, wherein the ingredient (C) is at least one oligomer selected from the group consisting of oligomers which contain at least two vinyl groups, allyl groups, methacryloyl or acryloyl groups or crotonyl groups, and 2 to 10 carboxyl groups, sulfonyl groups, or phosphoryl groups.

14. The radiation-curable ink composition according to claim 1, wherein the ingredient (C) is synthesized by reacting an epoxy-acrylate or methacrylate with a cyclic acid anhydride, wherein the epoxy-acrylate or methacrylate is obtained by ring-opening esterification of a poly-epoxy compound and a methacrylic acid or acrylic acid.

15. The radiation-curable ink composition according to claim 14, wherein the epoxy-acrylate or methacrylate is at least one compound selected from the group consisting of a methacrylic or acrylic acid derivative of neopentyl glycol diglycidyl ether, a methacrylic or acrylic acid derivative of 1,6-hexanediol diglycidyl ether, a methacrylic or acrylic acid derivative of trimethylol propane triglycidyl ether, a methacrylic or acrylic acid derivative of bisphenol A glycidyl ether, a methacrylic or acrylic acid derivative of epoxyphenolnovolak, and a methacrylic or acrylic acid derivative of phthalic acid diglycidyl ether.

16. The radiation-curable ink composition according to claim 14, wherein the acid anhydride component is succinic anhydride, maleic anhydride, dodecylsuccinic anhydride, phthalic anhydride, trimellitic anhydride, tetrahydrophthalic anhydride or a mixture of at least two in these anhydrides.

17. The radiation-curable ink composition according to claim 1, wherein the double bond-containing fluorinated carboxylic ester for the ingredient (D) is a fluorinated alcoholic residue-containing ester or a fluorinated macromonomer wherein the main chain has a fluorinated group and the side chain is a pendent acryloyl or methacryloyl group.

18. The radiation-curable ink composition according to claim 1, wherein the carboxylic ester for the ingredient (D)

is at least one methacrylate or acrylate ester selected from the group consisting of trifluoroethyl methacrylate or acrylate, tetrafluoropropyl methacrylate or acrylate, octafluoropentyl methacrylate or acrylate, and heptadecafluorodecyl methacrylate or acrylate.

19. The radiation-curable ink composition according to claim 1, wherein the carboxylic ester for the ingredient (D) is combined in the range of 1 to 20 parts by weight per 100 parts of the vehicle mixture.

20. The radiation-curable ink composition according to claim 1, wherein the block copolymer comprising a fluorinated alkyl group-containing polymer segment and a methacrylic or acrylic polymer segment is combined in the range of 1 to 10 parts by weight per 100 parts of the vehicle mixture.

21. The radiation-curable ink composition according to claim 1, wherein the block copolymer comprising a siloxane group-containing polymer segment and a methacrylic or acrylic polymer segment is combined in the range of 0.5 to 10 parts by weight per 100 parts of the vehicle mixture.

22. The radiation-curable ink composition according to claim 1, wherein the ingredient (D) is the mixture of two or three members selected from the group consisting of (1) a double bond-containing fluorinated carboxylic ester wherein the fluorinated component is oriented on the surface of the cured ink film, (2) a block copolymer which comprises a fluorinated alkyl group-containing polymer segment and a acrylic polymer segment, and (3) a block copolymer which comprises a siloxane group-containing polymer segment and a methacrylic or acrylic polymer segment.

23. The radiation-curable ink composition according to claim 22, wherein the total amount of said three components is in the range of 1 to 10 parts by weight per 100 parts of the vehicle mixture.

24. The radiation-curable ink composition according to claim 1, wherein the ingredient (E) is at least one compound selected from the group consisting of dihydric alcohol dimethacrylates or diacrylates, trihydric alcohol trimethacrylates or triacrylates, polyhydric alcohol methacrylates or acrylates, epoxy methacrylates or acrylates, urethane methacrylates or acrylates, ester methacrylates or acrylates, polyether methacrylates or acrylates, polybutadiene urethane methacrylates or acrylates and polybutadiene methacrylates or acrylates.

25. The radiation-curable ink composition according to claim 1, wherein the ingredient (F) is selected from the group consisting of 2-ethylhexyl methacrylate or acrylate, cyclohexyl methacrylate or acrylate, dicyclopentanyl methacrylate or acrylate, benzyl methacrylate or acrylate, phenoxyethyl methacrylate or acrylate, tolyloxyethyl methacrylate or acrylate, ethoxyethyl methacrylate or acrylate, ethylcarbitol methacrylate or acrylate, isobornyl methacrylate or acrylate, methoxypropylene glycol methacrylate or acrylate, methacryloylmorpholine, acryloylmorpholine, N-vinylpyrrolidone, N-vinylcaprolactam, N, N-diethylaminoethyl methacrylate or acrylate, t-butylaminoethyl methacrylate or acrylate, 2-hydroxyethyl methacrylate or acrylate, 2-hydroxypropyl methacrylate or acrylate, 3-butoxy-2-hydroxypropyl methacrylate or acrylate, caprolactone-modified 2-hydroxyethyl methacrylate or acrylate, 3-phenoxy-2-hydroxypropyl methacrylate or acrylate, glycidyl methacrylate or acrylate, and ethylene oxide-modified butoxylated phosphoric acid methacrylate or acrylate.

26. A radiation-curable ink composition which comprises a vehicle mixture comprising:

(A) at least one ingredient selected from the group consisting of a linear polyester oligomer substantially free of an acid group and free of a polymerizable double bond on the linear polyester chain, wherein 1 to 10 double bonds are pendent from the linear polyester chain; a linear polyester polymer substantially free of an acid group and free of a polymerizable double bond on the linear polyester chain, wherein 1 to 10 double bonds are pendent from the linear polyester chain; and mixtures thereof, (B) at least one ingredient selected from the group consisting of a one double bond-containing carboxylic acid wherein the acid has at least one acid group, a carboxylic ester of the said acid, a carboxylic amide of the said acid, and mixtures thereof, (C) a double bond-containing polycarboxylic ester, wherein 2 to 10 acid groups are present and at least 2 double bonds are pendent from the carboxylic ester having 2 to 10 acid groups, and (D) at least one ingredient selected from the group consisting of a double bond-containing fluorinated carboxylic ester, a block copolymer comprising a fluorinated alkyl group-containing polymer segment and a methacrylic or acrylic polymer segment, a block copolymer comprising a siloxane group-containing polymer segment and a methacrylic or acrylic polymer segment, and mixtures thereof, wherein the acid value of the vehicle mixture is from 5 to 100.

27. The radiation-curable ink composition according to claim 26, further comprising:

(E) a double bond-containing carboxylic ester, having at least 2 double bonds and free of an acid group, provided that it is excluded from the above-mentioned ingredient (A), and (F) at least one ingredient selected from the group consisting of a one double bond-containing carboxylic ester free of an acid group, a one double bond-containing carboxylic amide free of an acid group, a one double bond-containing carboxylic imide free of an acid group, and mixtures thereof.

\* \* \* \* \*